Sept. 8, 1970 W. A. MEANS 3,527,971
APPARATUS FOR MOUNTING BRUSHES AND DIODES IN
A DYNAMOELECTRIC MACHINE
Filed May 8, 1968 2 Sheets-Sheet 1
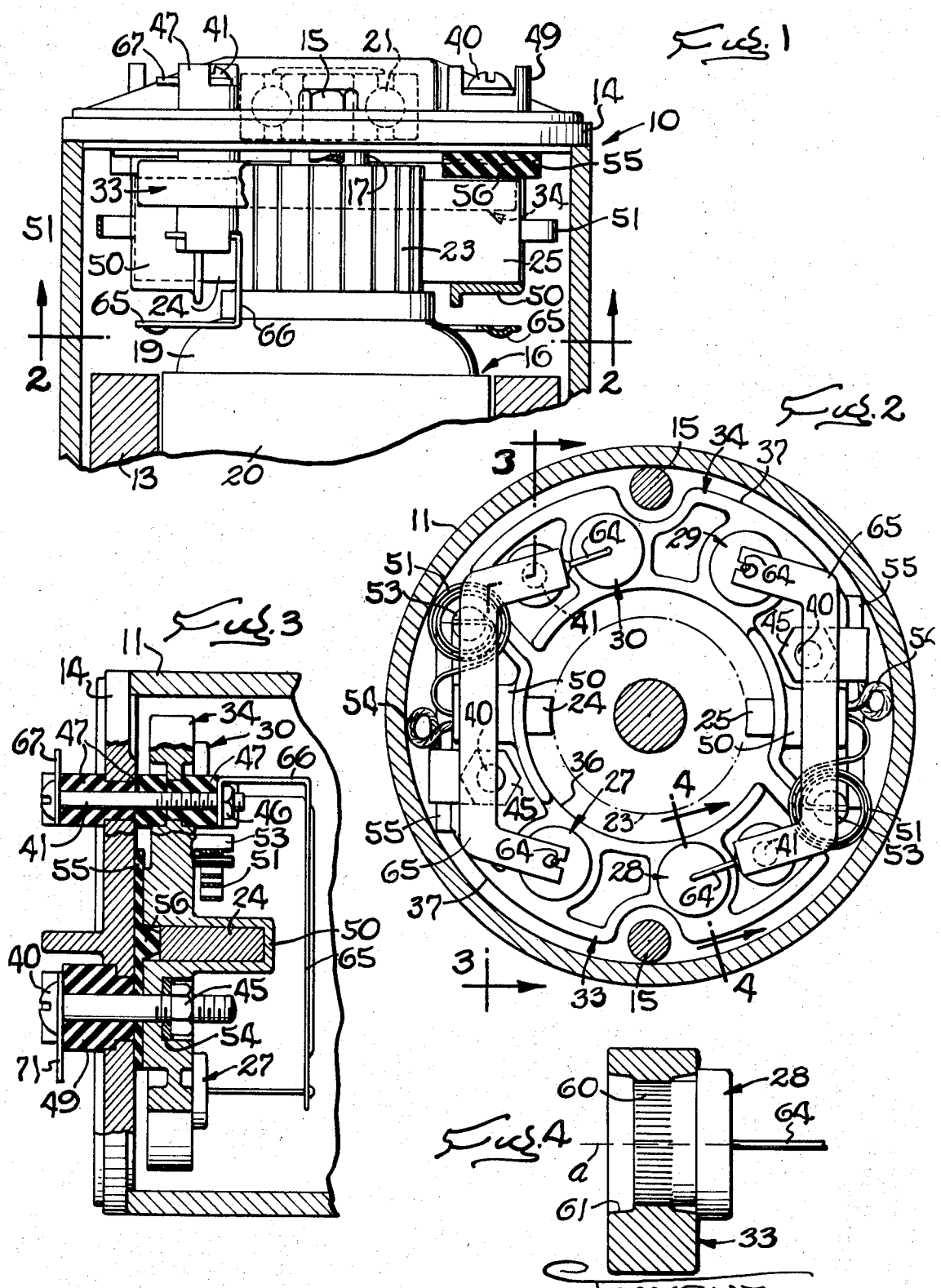
INVENTOR
William A. Means
by Wolfe, Hubbard, Voit & Osann
ATTORNEYS

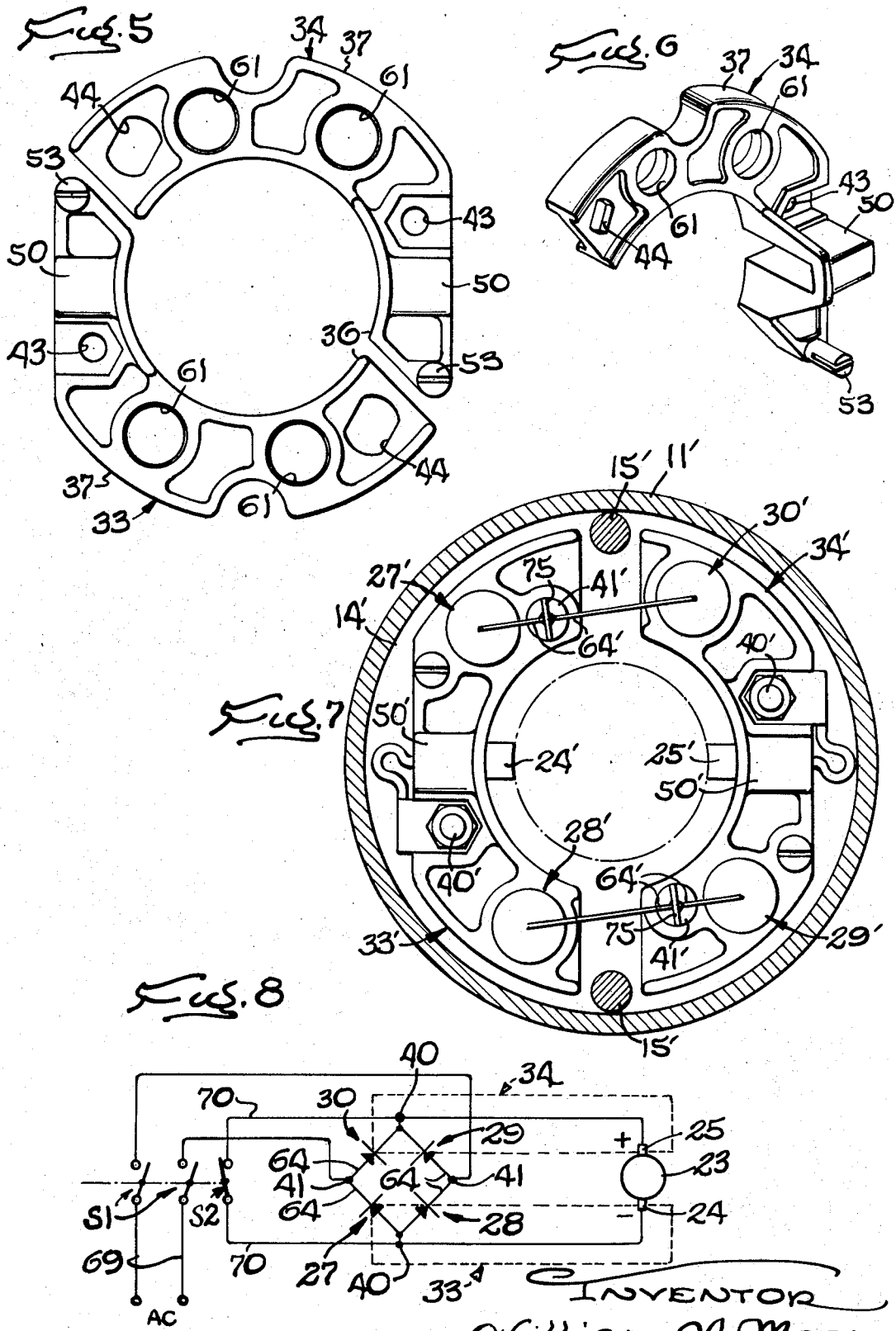

United States Patent Office 3,527,971
Patented Sept. 8, 1970

3,527,971
APPARATUS FOR MOUNTING BRUSHES AND DIODES IN A DYNAMOELECTRIC MACHINE
William A. Means, Rockford, Ill., assignor to Applied Motors, Inc., Rockford, Ill., a corporation of Illinois
Filed May 8, 1968, Ser. No. 727,427
Int. Cl. H02k 11/00
U.S. Cl. 310—68                         5 Claims

ABSTRACT OF THE DISCLOSURE

A pair of arcuate mounting plates made of electrically and thermally conductive material are attached to the end bell of a direct current motor and physically support not only the contact brushes of the motor but also a series of diodes for providing full wave rectification of alternating current supplied to energize the armature winding. Each plate serves to connect the diodes and brushes electrically to simplify the wiring within the motor and, in addition, acts as a heat sink to promote the dissipation of heat generated by the diodes. The mounting plates are shaped to present large surface areas for effectively dissipating the heat and yet are arranged to fit compactly within space which otherwise would be wasted in the motor housing, thereby avoiding the need of increasing the physical size of the motor to accommodate the plates.

---

This invention relates in general to dynamoelectric machines and more particularly to the mounting of electrical contact brushes and rectifying elements in such a machine.

Certain dynamoelectric machines, as for example direct current motors, are energized by alternating current which is rectified and converted into pulsating direct current just prior to passage into the brushes and windings of the motor. Such a motor usually includes an armature and a commutator rotatable within a generally cylindrical housing which is closed at one end by an end bell disposed adjacent the commutator. The contact brushes are attached to the end bell and engage the commutator to transfer current to the armature from an external power source.

As is well known, energization of such a DC motor from a source of alternating current may be accomplished by mounting a number of rectifying elements such as diodes on the end bell and by connecting the rectifying elements electrically between the source and the brushes to provide full wave rectification of the current conducted to the brushes, so that the current flow through the armature will be in one direction only. During prolonged use, the rectifying elements create a considerable amount of internal heat which tends to shorten the service life of the rectifying elements if permitted to remain concentrated around the latter and therefore unduly elevate their operating temperature.

The primary object of the present invention is to conduct and dissipate large quantities of heat away from the rectifying elements to maintain the latter relatively cool during service use and, at the same time, to simplify the electrical connections and reduce the wiring required between the rectifying elements and the contact brushes of a dynamoelectric machine of the above character.

A more detailed object is to support the rectifying elements and the contact brushes physically on thermally and electrically conductive mounting plates which not only electrically connect the brushes and the rectifying elements but which also serve as heat sinks to conduct heat away from the rectifying elements.

The invention also resides in the novel shape and arrangement of the mounting plates permitting their compact disposition within the motor housing adjacent the end bell while providing comparatively large exposed surface areas to promote more effective dissipation of heat away from the rectifying elements.

Other objects and advantages of the invention will become apparent from the following detailed description taken in conjunction with the accompanying drawings, in which:

FIG. 1 is a side view of one embodiment of a new and improved dynamoelectric machine incorporating the novel features of the present invention, part of the housing of the machine being broken away and shown in section for purposes of clarity;

FIG. 2 is a cross-section taken substantially along the line 2—2 of FIG. 1;

FIG. 3 is a fragmentary section taken substantially along the line 3—3 of FIG. 2;

FIG. 4 is an enlarged fragmentary section taken substantially along the line 4—4 of FIG. 2;

FIG. 5 is a plan view of the mounting plates, showing the latter as arranged within the housing of the dynamoelectric machine;

FIG. 6 is a perspective view of one of the mounting plates shown in FIG. 5;

FIG. 7 is a view similar to FIG. 2 but showing a second embodiment of the invention; and FIG. 8 is a diagram of the circuit between the contact brushes and the rectifying elements.

While the invention has been shown and will be described in some detail with reference to particular embodiments thereof, there is no intention that it thus be limited to such detail. To the contrary, it is intended here to cover all modifications, alternatives and equivalents falling within the spirit and scope of the invention as expressed in the appended claims.

Referring to FIG. 1, there is shown an exemplary dynamoelectric machine in the form of a DC motor 10 having a generally cylindrical housing 11 within which is fixed an annular permanent magnet assembly 13 which provides the internal magnetic field. A circular-shaped cover 14 (customarily referred to as an end bell) closes one end of the housing and carries longitudinally extending screws 15 (FIG. 2) which secure the parts together to form a stator assembly.

Centered within the magnet assembly 13 is a rotor or armature 16 (FIG. 1) comprising a central shaft 17 rotatable about the axis of the housing 11 and carrying a winding 19 in a slotted, laminated core structure 20 of permeable material. The shaft is journaled adjacent its ends in a bearing 21 fixed to the end bell 14 and in a similar bearing (not shown) located at the other end of the housing, and supports a rotational connector which herein is in the form of a commutator 23 disposed end-to-end with the core 20 and having individual conductive segments conventionally connected electrically to the winding 19. Two carbon contact brushes 24 and 25 extend radially of and are spaced diametrically around the commutator and engage the segments to transfer unidirectional current to the winding from an external power source, thereby to create an electromagnetic field which acts in conjunction with the electromagnetic field developed by the permanent magnet assembly 13 to produce the torque necessary for sustained and continuous running of the motor.

As described thus far, the motor 10 is especially suitable for use in driving small power tools, electric lawn-mowers and the like. When so employed, the motor generally is energized from a domestically available voltage supply of alternating current thus necessitating the incorporation of means in the motor for converting such current into direct current prior to passage into the armature winding 19. In this specific instance these means comprise rectifying elements in the form of four silicon diodes 27–30 located of generally circular cross-section adjacent the inside wall of the end bell 14 and connected electrically to the brushes 24 and 25 to provide full wave rectification of the current conducted through the winding from the brush 25 to the brush 24. Such diodes are compact in size and have a tendency to develop internal heat during sustained usage. Unless the heat is dissipated, the diodes will deteriorate at the resulting elevated temperature, become inefficient in performance, and experience only a short service life.

In accordance with the primary aspect of the present invention, the diodes 27–30 and the brushes 24, 25 are supported physically by novel mounting plates 33 and 34 which electrically interconnect the diodes and the brushes to simplify the wiring within the motor 10 and which, at the same time, act as heat sinks to conduct the heat away from the diodes for dissipation into the surrounding air. For these purposes, the mounting plates are made of thermally and electrically conductive metal and each carries two diodes and a brush, the diodes being embedded in the mounting plate and being connected electrically to one another and the associated brush through the plate. As a result, further electrical connections from the diodes to the brushes are unnecessary and, with the diodes in intimate contact with the plates, most of the heat generated by the diodes is dispelled through the plates to insure against the diodes becoming overheated.

In this specific instance, each mounting plate 33, 34 is of one-piece construction and preferably is die cast from a conductive aluminum alloy. In furtherance of the invention, the mounting plates are shaped in a novel manner and are arranged compactly in the motor housing 11 to provide large surface areas for dissipating heat while occupying within the housing only void space which otherwise would be wasted. To these ends and as shown in FIGS. 2 and 5, the plates are shaped generally as semicircles and are attached to the inner wall of the end bell 14 in a common plane and in spaced end-to-end relationship with one another to define substantially a full circle adjacent the end bell. Each mounting plate is defined by an inner arcuate wall 36 extending around the commutator 23 and formed on a radius just slightly larger than that of the commutator so as to leave little wasted space between the two. In addition, the outer wall 37 of each plate is, for the most part, arcuate in configuration and is curved about the axis of the housing 11 on a radius just smaller than that of the housing. Shaped and arranged in this manner, the two mounting plates occupy most of the annular space between the commutator and the housing and thus present a relatively large total surface area for the effective dissipation of heat from the diodes 27–30. By thus utilizing the otherwise wasted space within the housing, the mounting plates may be incorporated advantageously in the motor without increasing its overall size.

To attach the mounting plates 33, 34 to the end bell 14, two bolts 40 and 41 project through the end bell and through holes 43 and 44 (FIG. 5), respectively, in each of the mounting plates and are anchored in place by nuts 45 and 46 (FIG. 3). Suitable spacers 47 of insulating material surround the bolts 41, serving to insulate the latter from the plates and also to keep the plates spaced from the end bell. The bolts 40 are insulated from the end bell by similar spacers 49 but are allowed to contact the mounting plates for a purpose to be described below.

Formed integrally with each mounting plate 33, 34 near one end thereof is a brush holder 50 for receiving and supporting respective ones of the contact brushes 24, 25, the two brush holders being spaced diametrically from one another when the plates are attached to the end bell in a circular arrangement. Herein, each brush holder is shaped as an inverted arch projecting downwardly from the plane of its respective plate and formed with open sides and an open upper end. The brushes 24 and 25 are telescoped slidably into the holders on the plates 33 and 34, respectively, and each is urged against the periphery of the commutator 23 by a spiral spring 51 (FIG. 2) whose one end bears against the brush and whose other end is anchored in a slot in a post 53 formed integrally with and depending from the mounting plate. Good electrical conduction between each brush and its respective mounting plate is established by a pigtail 54 connected between the brush and the adjacent bolt 40. A non-conductive pad 55 (FIG. 3) is sandwiched between each mounting plate and the end bell and is formed with a rib 56 which projects into the open end of the brush holder 50 in engagement with the upper side of the brush to hold the latter in place and to keep the plate and the brush from contacting the end bell.

As shown in FIGS. 2 and 4, the diodes 27 and 28 are carried by the mounting plate 33 and each includes a conductive cap 60 which is electrically integral with the anode or first electrode of the diode and which is press-fitted into a hole 61 in the plate for good electrical and thermal contact with the latter. Thus, the two diodes 27 and 28 are connected electrically to one another and also to the brush 24 simply by physical contact to their anodes with the mounting plate 33. In a similar manner, the diodes 29 and 30 are press-fitted into holes 61 in the mounting plate 34 but in reverse fashion with their cathodes or first electrodes in contact with the plate which thus electrically connects them to one another and the brush 25. The cathode or second electrode of the diode 27 and the anode or second electrode of the diode 30 are connected to one of the bolts 41 by metal wires 64 (FIG. 2) attached to opposite ends of a conductive strap 65 which bridges the brush holder 50 on the plate 33. Similar wires 64 are attached to the ends of a second strap 65 bridging the other brush holder and serve to connect the cathode or second electrode of the diode 28 and the anode or second electrode of the diode 29 to the other bolt 41. As shown most clearly in FIG. 3, each strap 65 is formed with a leg 66 which is attached to one of the bolts 41 thus completing a circuit between the bolts and the diodes via the straps and the wires 64. The bolts 41 carry clips 67 (FIG. 3) adapted for attachment to lines 69 (FIG. 8) connected into the AC power supply, and thus the two bolts constitute the input terminals of the motor 10. Accordingly, one diode of each pair on a given mounting plate is connected to one input terminal of the motor and the other diode of each pair is connected to the other input terminal of the motor. Each diode has a longitudinal axis $a$ (FIG. 4) extending through its anode and cathode, and such axis generally parallels that of the housing 11.

With the foregoing arrangement, a bridge circuit (FIG. 8) is formed with the diodes 29 and 30 poled to permit current flow toward the brushes and the diodes 27 and 28 poled to permit current flow away from the brushes when manually operated switches S1 in the lines 69 are closed. Accordingly, full wave rectification of the current is provided thus permitting energization of the DC motor from an AC voltage source. As shown in FIG. 8, that part of the circuit between the brush 24 and the anodes of the diodes 27 and 28 is formed by the mounting plate 33, and that part of the circuit between the brush 25 and the cathodes of the diodes 29 and 30 is formed by the mounting plate 34. By thus utilizing the mounting plates to connect the diodes and brushes electrically, the wiring necessary to establish the bridge circuit is reduced. Moreover, the plates, being in intimate contact with the diodes, conduct heat away from the diodes and present relatively large surface areas over which the heat is dissipated. Usually, a fan (not shown) is attached to the shaft 17 for circulating air through the housing 11 to remove the heat emanating from the plates and the armature winding 19.

Advantage is taken of the bolts 40 to effect dynamic braking of the motor 11 when the switches S1 are opened to de-energize the motor. As shown in FIGS. 3 and 8, leads 70 are attached to clips 71 on each of the bolts 40 and connect the brushes 24, 25 electrically to one another through a switch S2 which is open when the switches S1 are closed. At the same time the switches S1 are opened to de-energize the motor, the switch S2 is closed to establish a circuit between the brushes through the leads 70, the bolts 40 and the mounting plates 33, 34. With the switches S2 closed, continued rotation of the armature 16 within the magnet assembly 13 after de-energization of the winding 19 causes the generation of current which flows reversely through the winding from the brush 24 to the brush 25 to set up an electromagnetic field exerting a dynamic braking torque on the armature to bring the latter to a stop. Thus, the bolts 40 for attaching the mounting plates to the end bell 14 also serve as terminals for establishing a dynamic braking circuit for the motor.

Another embodiment of the invention is shown in FIG. 7 in which parts corresponding to those of the first embodiment are indicated by the same but primed reference numerals. As before, two arcuate and coplanar mounting plates 33' and 34' are attached to the end bell 14' of the motor with the plate 33' supporting a brush 24' and two diodes 27', 28' and with the plate 34' supporting a brush 25' and two diodes 29' and 30'. In this instance, however, each brush is supported in a brush holder 50' which is located between the two diodes on the associated plate and which is formed near the arcuate midpoint of the plate rather than adjacent one end thereof as in the previous embodiment. Thus, the cathode of the diode 27' and the anode of the diode 30' may be connected to one of the terminal bolts 41' through the use of two wires 64' extending in a straight line between the diodes and fastened to a terminal clip 75 on the bolt 41'. A similar pair of wires 64' extend in a straight line between the diodes 28' and 29' and are fastened to a terminal clip 75 on the other bolt 41' to connect the latter to the cathode of the diode 28' and the anode of the diode 29'. By locating each brush holder between the diodes on its respective mounting plate, it is not necessary to bridge the brush holders to connect the diodes to the terminal bolts, so that the connecting straps 65 may be eliminated to add still further to the simplicity and compactness of the assembly.

From the foregoing, it will be apparent that the novel mounting plates 33, 34 and 33', 34' of the present invention simplify the connections between the brushes and rectifying elements of a dynamoelectric machine while at the same time serving as heat sinks to dissipate heat created by and within the rectifying elements. While the invention has been illustrated and described specifically in conjunction with a direct current motor, it will be appreciated that the broader principles thereof are applicable equally well to other types of dynamoelectric machines such as alternators and the like wherein diodes are used to rectify the output of the machine instead of the input.

I claim as my invention:

1. In an electrical motor having two electrical input terminals and having a rotor and a commutator rotatable about a predetermined axis within a housing closed at one end by an end bell having an inside wall disposed adjacent and facing one end of the commutator, the improvement comprising, a pair of separate mounting plates made of electrically and thermally conductive material attached to and insulated from the inside wall of said end bell, a brush holder formed integrally with each mounting plate and spaced diametrically about said commutator from the brush holder on the other plate, a brush supported within each of said brush holders in engagement with the commutator and connected electrically to the associated mounting plate to conduct current between the commutator and such plate, each of said brushes extending generally radially of said axis, a first pair of diodes supported physically on one of said mounting plates and electrically connected to one another and to the brush on such plate by physical contact of their anodes with the plate, a second pair of diodes supported physically on the other of said plates and electrically connected to one another and to the brush on such other plate by physical contact of their cathodes with such plate, each diode having a longitudinal axis extending through its anode and cathode with such axis extending generally parallel to the rotational axis of the commutator, means electrically connecting the cathodes of said first pair of diodes to different ones of said input terminals, means electrically connecting the anodes of said second pair of diodes to different ones of said input terminals, said diodes thereby being poled to provide full wave rectification of current conducted between said brushes and said terminals.

2. In an electrical motor having two electrical input terminals and having a substantially cylindrical rotor and commutator rotatable within and about the axis of a generally cylindrical housing closed at one end by an end bell having an inside wall disposed adjacent and facing one end of the commutator, the improvement comprising, a pair of separate and coplanar mounting plates made of electrically and thermally conductive metal attached to and insulated from the inside wall of said end bell with each mounting plate being shaped generally as a semicircle and being disposed in spaced end-to-end relation with the ends of the other mounting plate, each of said mounting plates being defined at least in part by an outer arcuate wall curved about said axis on a radius just slightly less than that of said housing and being defined at least in part by an inner arcuate wall curved about said axis on a radius just slightly greater than that of said commutator, a brush holder formed integrally with each mounting plate and spaced diametrically from the brush holder on the other plate, a brush supported within each brush holder in engagement with said commutator and electrically connected to the associated mounting plate to conduct current between the commutator and such plate, each of said brushes extending generally radially of said axis, a first pair of diodes physically supported on one of said mounting plates and electrically connected to one another and to the brush on such plate by physical contact of their anodes with the plate, a second pair of diodes physically supported on the other of said plates and electrically connected to one another and to the brush on such other plate by physical contact of their cathodes with such plate, each diode having a longitudinal axis extending through its anode and cathode with such axis extending generally parallel to the axis of the housing, means electrically connecting the cathodes of said first pair of diodes to different ones of said input terminals, means electrically connecting the anodes of said second pair of diodes to different ones of said input terminals, said diodes thereby being poled to provide full wave rectification of current conducted between said brushes and said terminals.

3. An electrical motor as defined in claim 2 in which the brush holder of each plate is located between the two diodes on such plate.

4. In a dynamoelectric machine having two electrical terminals and having a rotor and a rotational connector rotatable about a predetermined axis within a housing closed at one end by an end bell having an inside wall disposed adjacent and facing one end of the connector, the improvement comprising, a pair of separate mounting plates made of electrically and thermally conductive material attached to and insulated from the inside wall of said end bell, a brush holder formed integrally with each mounting plate and spaced diametrically about said connector from the brush holder on the other plate, a brush supported within each of said brush holders in engagement with the connector and electrically connected to the associated mounting plate to conduct current between the connector and such plate, each of said brushes extending generally radially of said axis, two pairs of rectifying elements each having a first and a second electrode, each rectifying element having a longitudinal axis extending through its electrodes and oriented generally parallel to the rotational axis of said commutator, each of said pairs of rectifying elements being supported physically on a different one of said plates with the rectifying elements of each pair being connected electrically to one another and to the brush on such plate by physical contact of like first electrodes with the plate, means electrically connecting the second electrode of one rectifying element of each pair to one of said terminals and the second electrode of the other rectifying element of each pair to the other of said terminals, and said rectifying elements being poled to provide full wave rectification of current conducted between said brushes and said terminals.

5. A dynamoelectric machine as defined in claim 4 in which the brush holder of each plate is located between the rectifying elements on such plate.

References Cited

UNITED STATES PATENTS

| | | | |
|---|---|---|---|
| 2,683,826 | 7/1954 | Staak | 310—71 X |
| 3,146,362 | 8/1964 | Bates | 310—68 |
| 3,173,038 | 3/1965 | Brown | 310—68 |
| 3,194,994 | 7/1965 | Latta | 310—239 X |
| 3,329,841 | 7/1967 | Binder | 310—68 |
| 3,339,096 | 8/1967 | Heing | 310—68 |

WARREN E. RAY, Primary Examiner

M. O. BUDD, Assistant Examiner

U.S. Cl. X.R.

310—239